(12) United States Patent
Übler et al.

(10) Patent No.: US 8,679,668 B2
(45) Date of Patent: Mar. 25, 2014

(54) INDUSTRIAL APPARATUS FOR THE LARGE-SCALE STORAGE OF ELECTRIC ENERGY

(75) Inventors: Christoph Übler, Lautersheim (DE); Dietmar Bender, Böhl-Iggelheim (DE); Günther Huber, Ludwigshafen (DE); Andreas Fischer, Heppenheim (DE); Bernd Schube, Mutterstadt (DE); Glyn Atherton, Cheshire (GB); Francis Michael Stackpool, Cheshire (GB); Cord-Henrich Dustmann, Sagno (CH)

(73) Assignee: BASF SE (DE)

( * ) Notice: Subject to any disclaimer, the term of this patent is extended or adjusted under 35 U.S.C. 154(b) by 109 days.

(21) Appl. No.: 13/166,359

(22) Filed: Jun. 22, 2011

(65) Prior Publication Data

US 2011/0311845 A1    Dec. 22, 2011

Related U.S. Application Data

(60) Provisional application No. 61/357,110, filed on Jun. 22, 2010.

(51) Int. Cl.
*H01M 4/36* (2006.01)

(52) U.S. Cl.
USPC ........... 429/104; 429/101; 429/102; 429/103; 429/133; 429/134; 429/140; 429/166

(58) Field of Classification Search
USPC ......... 429/101–104, 121, 133–135, 140, 153, 429/164, 166–168
See application file for complete search history.

(56) References Cited

U.S. PATENT DOCUMENTS

| | | | |
|---|---|---|---|
| 3,533,848 A | | 10/1970 | Winn |
| 3,791,868 A | * | 2/1974 | Compton et al. ............... 429/94 |
| 3,915,741 A | | 10/1975 | Kogiso et al. |
| 3,980,496 A | * | 9/1976 | Ludwig et al. ................ 429/103 |
| 4,037,027 A | | 7/1977 | Desplanches et al. |
| 4,038,465 A | | 7/1977 | Ludwig et al. |
| 4,041,216 A | | 8/1977 | Desplanches et al. |
| 4,510,681 A | | 4/1985 | Anand et al. |
| 4,576,881 A | | 3/1986 | Hasenauer et al. |
| 5,320,915 A | * | 6/1994 | Ali et al. ....................... 429/104 |
| 5,554,457 A | * | 9/1996 | Bugga et al. .................. 429/102 |
| 2008/0053837 A1 | * | 3/2008 | Huber et al. .................. 205/347 |
| 2011/0163258 A1 | | 7/2011 | Seeler et al. |

(Continued)

FOREIGN PATENT DOCUMENTS

| | | |
|---|---|---|
| DE | 1771148 A1 | 2/1972 |
| DE | 2610222 A1 | 10/1976 |

(Continued)

OTHER PUBLICATIONS

International Search Report for PCT/EP2011/060275, mailed Feb. 11, 2011.

*Primary Examiner* — Patrick Ryan
*Assistant Examiner* — Ben Lewis
(74) *Attorney, Agent, or Firm* — Novak Druce Connolly Bove + Quigg LLP

(57) ABSTRACT

The invention relates to an improved industrial apparatus for the large-scale storage of energy and a process for storing and transporting electric energy by means of this apparatus.

13 Claims, 9 Drawing Sheets

(56) References Cited

U.S. PATENT DOCUMENTS

| | | |
|---|---|---|
| 2011/0247606 A1 | 10/2011 | Major et al. |
| 2011/0260100 A1 | 10/2011 | Trukhan et al. |
| 2011/0271953 A1 | 11/2011 | Wortmann et al. |
| 2012/0040262 A1 | 2/2012 | Ubler et al. |

FOREIGN PATENT DOCUMENTS

| | | |
|---|---|---|
| DE | 2635900 A1 | 5/1977 |
| DE | 2927868 A1 | 1/1980 |
| EP | 116690 A1 | 8/1984 |
| EP | 0 553 400 A1 | 8/1993 |
| GB | 2030349 A | 4/1980 |
| JP | 63202865 A | 8/1988 |
| JP | 2000251931 A | 9/2000 |
| JP | 2001 118598 A | 4/2001 |
| JP | 2002184456 A | 6/2002 |
| WO | WO-2010/112466 A1 | 10/2010 |
| WO | WO-2011/020560 A1 | 2/2011 |
| WO | WO-2011/083054 A1 | 7/2011 |
| WO | WO-2011/124510 A1 | 10/2011 |
| WO | WO-2011/138270 A1 | 11/2011 |

\* cited by examiner

INDUSTRIAL APPARATUS FOR THE LARGE-SCALE STORAGE OF ELECTRIC ENERGY

CROSS-REFERENCE TO RELATED APPLICATIONS

This Application claims the benefit of U.S. Provisional Application 61/357,110 filed on Jun. 22, 2010, which is incorporated by reference.

BACKGROUND OF THE INVENTION

The invention relates to an improved industrial apparatus for the large-scale storage of energy and a process for storing and transporting electric energy by means of this apparatus.

The generation of electric energy is, in the case of fossil fuel-fired power stations, associated with the production of $CO_2$ and therefore has a considerable influence on the greenhouse effect. Generation of energy on the basis of renewable energy carriers, e.g. wind, solar, geothermal or hydroelectric, avoids this disadvantage. However, these renewable energy carriers are at present not available whenever wanted in accordance with the consumption profile. In addition, the site of energy generation may be different from the site of energy consumption. To compensate this disadvantage inherent in the system, storage, buffering and possibly also transport of the energy generated is necessary.

The energy from renewable sources such as wind turbines, solar plants is not obtained continuously. Demand and availability are not matched. A power grid which is based exclusively on renewable energies and is nevertheless stable cannot be obtained under these boundary conditions. There is therefore a need to equalize and buffer these fluctuations by means of inexpensive and energy-efficient systems having a high efficiency.

In many sparsely populated regions of the earth, e.g. the Sahara, Iceland or "off-shore", there is the potential of generating electric power quite efficiently from wind, sun or geothermal heat via wind power stations, solar plants or geothermal power stations because of the geographic, climatic and/or geological boundary conditions. However, there is a lack of industrial methods of transporting this energy to regions having a high consumption. Traditional transmission systems are limited by grid losses and costs of grid construction. Hydrogen technology in which electric energy produced is converted on site into hydrogen and subsequently converted into electric power in a fuel cell has an efficiency of about 20% and is therefore unattractive since transport and liquefaction of the hydrogen consume a major part of the energy.

Both the storage of large quantities of electric energy and the transport of electric energy over large distances is a problem which has not been solved satisfactorily to the present time. At present, pumped storage power stations in which the potential energy of the geodetic height difference of water is utilized for transformation into power are used for storing electric energies on an industrial scale. However, the construction of such pump storage power stations is limited by geographic and ecological boundary conditions. Pump storage power stations in which the compression of air is used for energy storage are limited because of their comparatively low efficiency. Other forms of energy storage, e.g. supercapacitors or the flywheel address other target markets (short-term storages). Batteries come closest to this requirement and have been realized industrially in various designs.

DE-A-2635900 discloses a battery which comprises at least one molten alkali metal as anode and a cathodic reactant whose reactivity with the anodic reactant is electrochemically reversible. The cathodic reactant comprises molten polysulfide salts or a two-phase composition composed of molten sulfur and polysulfide salts saturated with molten sulfur. This battery further comprises cation-permeable barrier layers for mass transfer between the anodic reaction zone and the cathodic reaction zone.

DE-A-2610222 discloses a battery comprising a plurality of sulfur-sodium cells, where each cell has 1) a cathodic compartment comprising a cathodic reactant 2) which is liquid at operating temperature and is composed of sulfur, phosphorus or selenium or alkaline salts of these elements, at least one solid electrolyte tube which comprises the anodic reactant which is liquid at the operating temperature and is composed of an alkali metal, in particular sodium, and also an anodic container 3) which comprises a reserve of the anodic reactant.

Connecting a plurality of sodium-sulfur batteries as module for an energy storage system is known from EP-A-116690.

All these batteries are closed systems whose energy storage is limited by the amount of reactants (redox partners) comprised in the battery. This limitation has been alleviated by the flow battery. This battery concept is based on liquid electrolytes comprising solvent and metal salt. The limited stock volume of the classical battery is increased by second stock vessels comprising the reactants.

DE-A-2927868 discloses a flow battery for storing and releasing electric energy in an electrochemical cell having an anode compartment and a cathode compartment which are separated from one another by a semipermeable ion-exchange membrane, where the anode compartment is supplied with an anolyte solution, an oxidizable compound which remains essentially dissolved in the anolyte solution and can be reduced again from its oxidized form, the oxidized anolyte solution is removed from the anolyte component and the oxidized anolyte solution is stored. At the same time, the catholyte compartment is supplied with a catholyte solution, a reducible compound which remains essentially dissolved in the catholyte solvent and can be reoxidized from its reduced form. The anolyte solution and the catholyte solution can be stored in two corresponding vessels and circulated through the anode compartment and cathode compartment by means of circulation pumps. The catholyte solution can, for example, comprise hexavalent chromium and the anolyte solution can comprise divalent chromium.

DE-A-1771148 and U.S. Pat. No. 3,533,848 disclose a system for obtaining electric energy by electrochemical combination of sodium and sulfur, wherein the system has a diaphragm permeable to sodium ions with adjacent spaces for sodium and sulfur, a container for storing the sodium outside the cell, lines for conveying the sodium from the storage container to the fuel cell, a container for storing the sulfur outside the cells and lines for conveying the sulfur from the storage container to the cell. These cells can, for example, be electrically connected in series.

It is known from JP-A-2001118598 that sodium-sulfur batteries can be operated with two or more cylinders in matrix form for molten sodium or molten sulfur.

It is known from JP-A-2002184456 that a sodium-sulfur battery can be operated with an external storage tank for sulfur which is connected in a fixed manner to the battery.

In the known sodium-sulfur batteries and their embodiments as flow battery, the input of the energy stored in the starting materials sodium and sulfur and the discharge by reaction of sodium and sulfur to form sodium sulfide and/or sodium polysulfides are coupled in time and space.

BRIEF SUMMARY OF THE INVENTION

It was an object of the invention to provide an improved apparatus and an improved process for an electrochemical power station on the basis of redox partners, in particular alkali metals, especially sodium, and, for example, sulfur.

The invention provides an apparatus for the storage of electric energy by means of materials A and S which form a redox pair and are present separately from one another, wherein a) the apparatus comprises the materials A and S,
b) the materials A and S are each comprised separately from one another in containers BA and BS which are arranged above one another,
c) where the containers BA and BS are joined by means of a solid electrolyte E which is permeable to cations and
d) the containers BA and BS are comprised in an overall container, wherein the apparatus comprises at least two overall containers comprising containers BA and BS joined by means of a solid electrolyte E.

In a particularly preferred embodiment, the material A is an alkali metal, in particular sodium, and the material S is sulfur.

The containers BA and BS connected by means of the electrolyte E represent a cell; in a preferred embodiment, this cell is in the form of a drum (hereinafter referred to as drum cell).

The invention further provides a process for the storage and release, optionally for the transport, of electric energy using an electrochemical reactor, wherein an apparatus according to the invention is used, in a particularly preferred embodiment with an alkali metal as material A, in particular sodium, and sulfur as material S.

Figure 3:
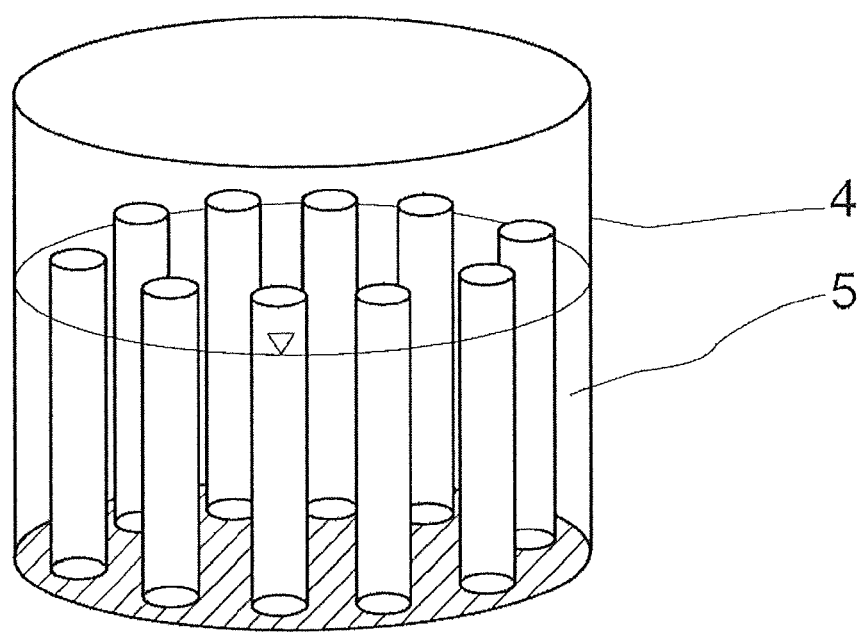

The main element of the upper drum is a steel drum (3) which is open at the bottom and has a steel sheet insert (4) which is closed at the bottom and open at the top, viz. a sodium reservoir. The sodium reservoir is provided with holes at the bottom and tube inserts in such a way that the sodium content (5) can communicate freely around the tube inserts without sodium being able to flow through the openings at the bottom (FIG. 3).

Figure 4:
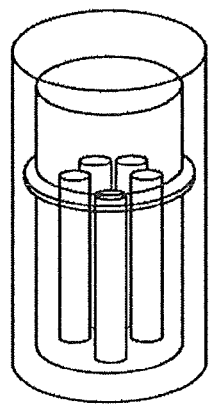
Figure 4:
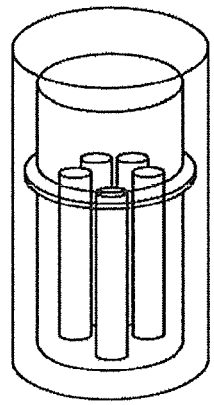
Figure 4:
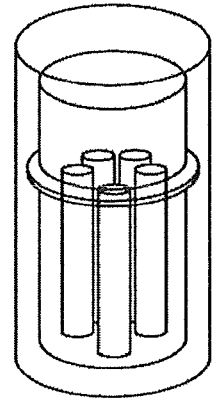
Figure 4:
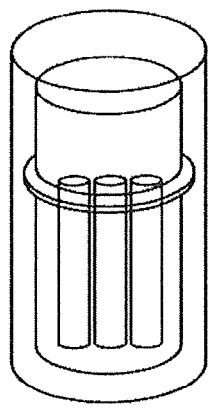
Figure 4:
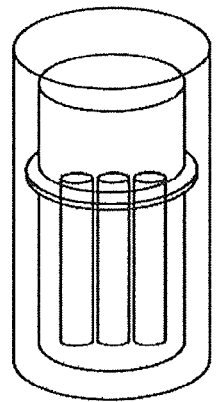
Figure 4:
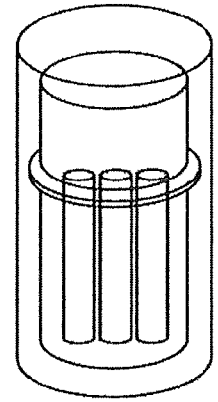
Figure 4:
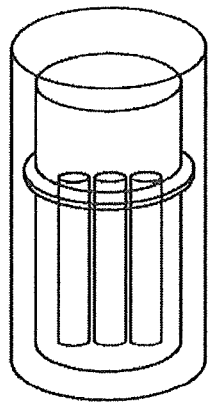
Figure 4:
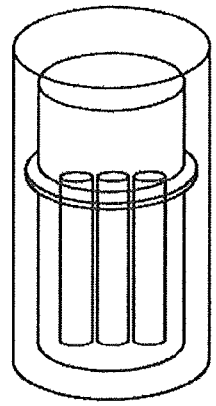

FIG. 4 shows possible ways of distributing the electrolytes in the form of ceramic tubes over the drum cell.

Figure 5:
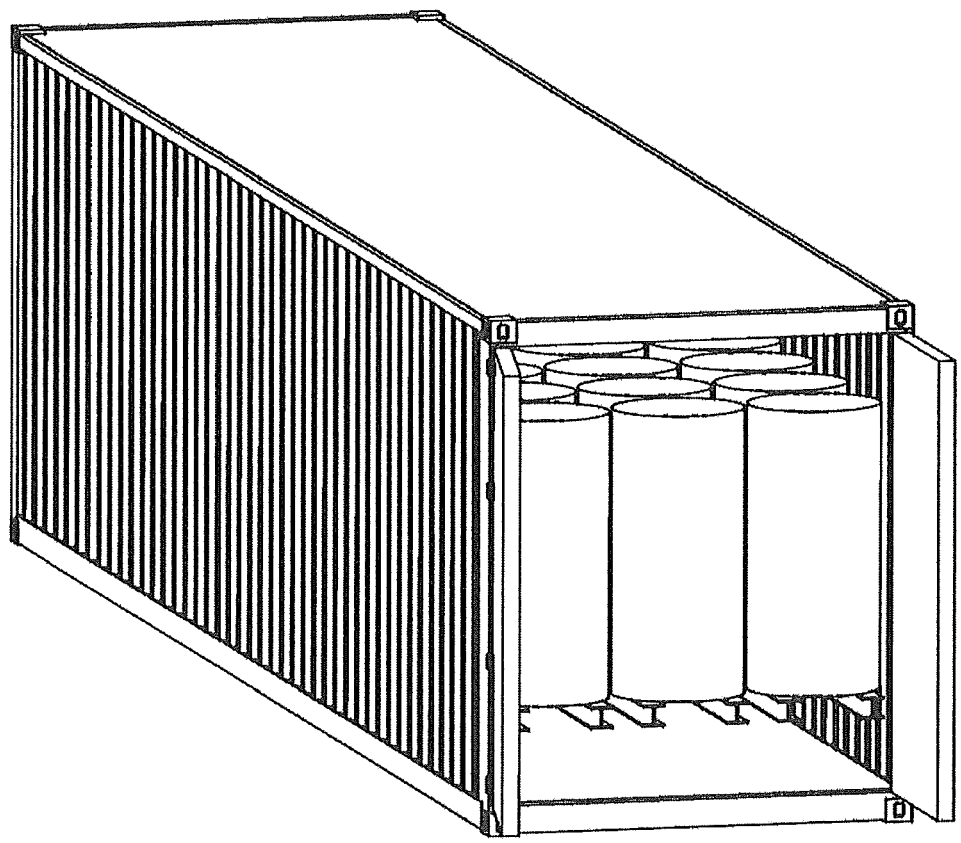

FIG. 5 shows the possible arrangement of the apparatus of the invention in the form of a container.

Figure 6:
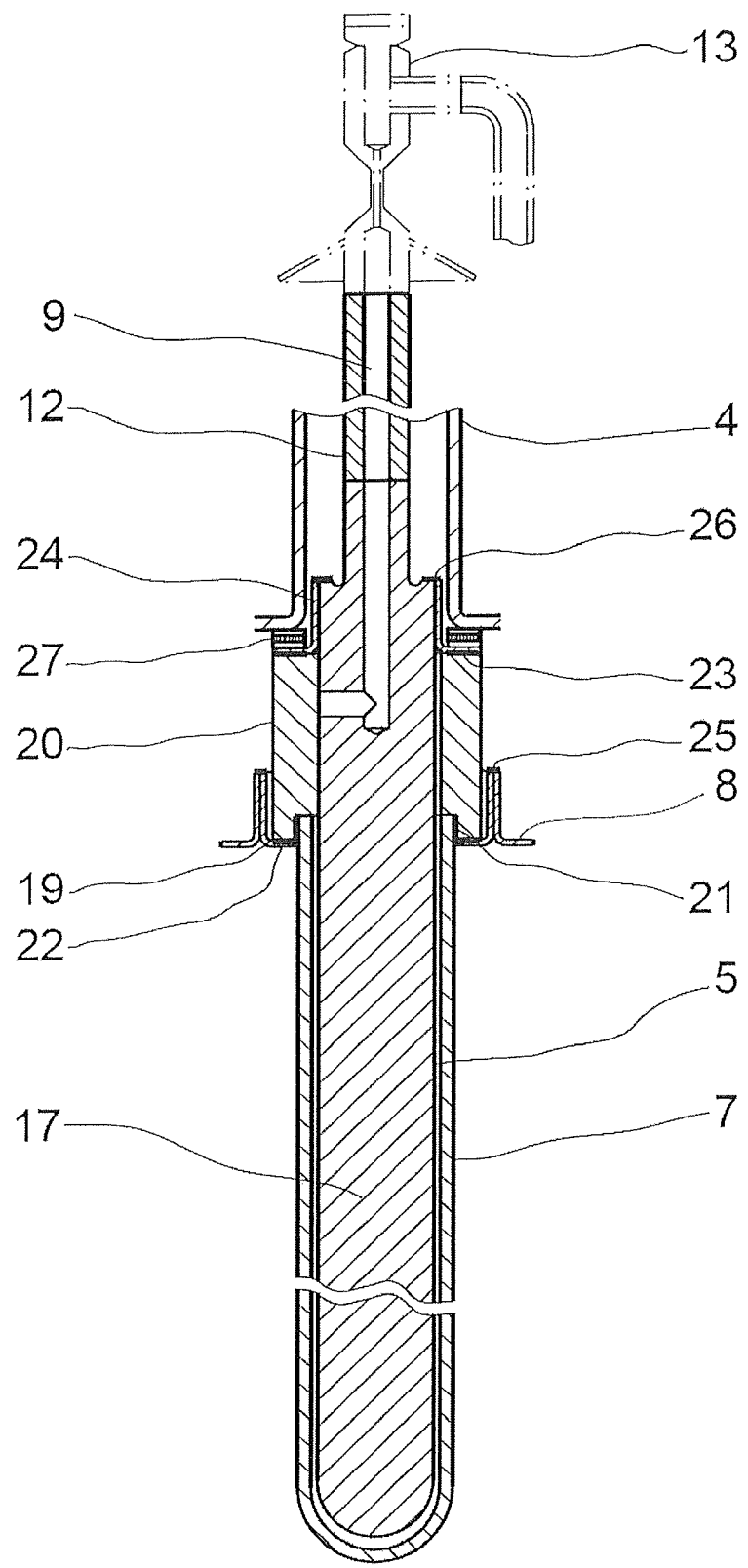

FIG. 6 shows a particular embodiment of the electrolyte E present in the form of a ceramic.

Figure 7:
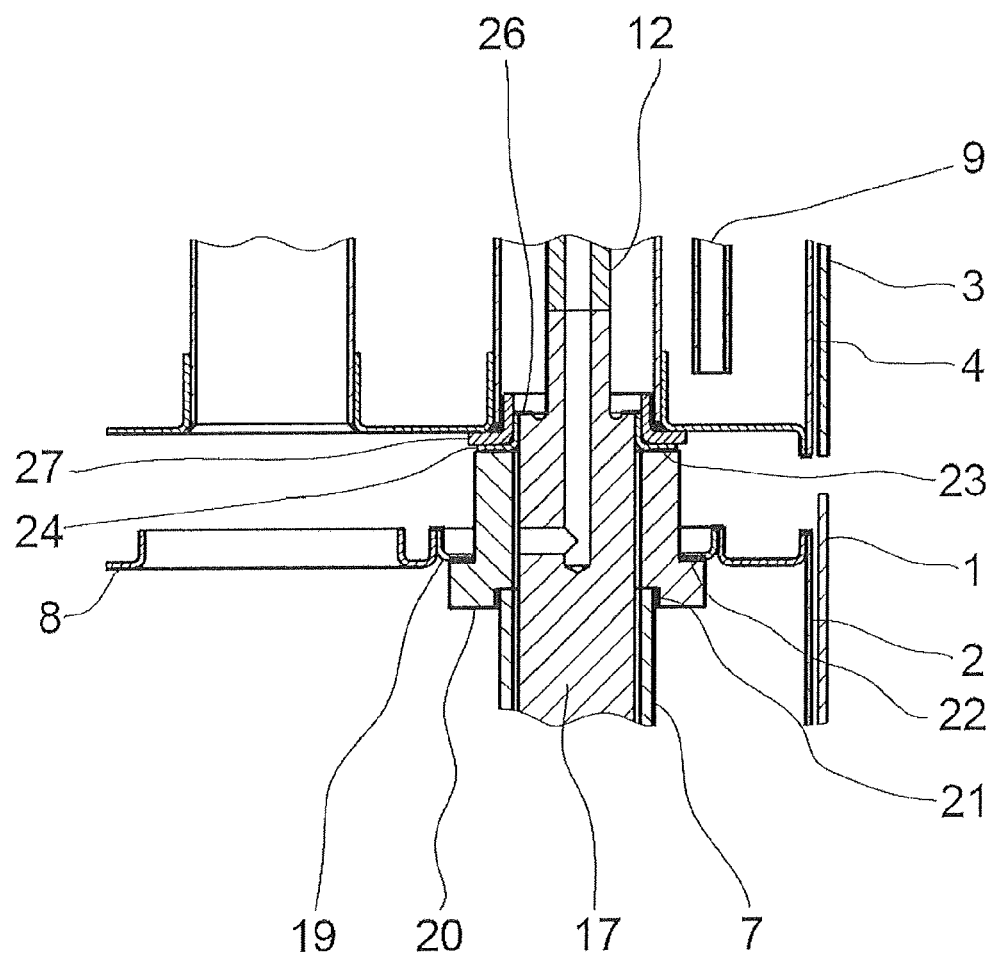

FIG. 7 shows a variant of the installation of the ceramic which is improved with a view to mass production.

Figure 8:
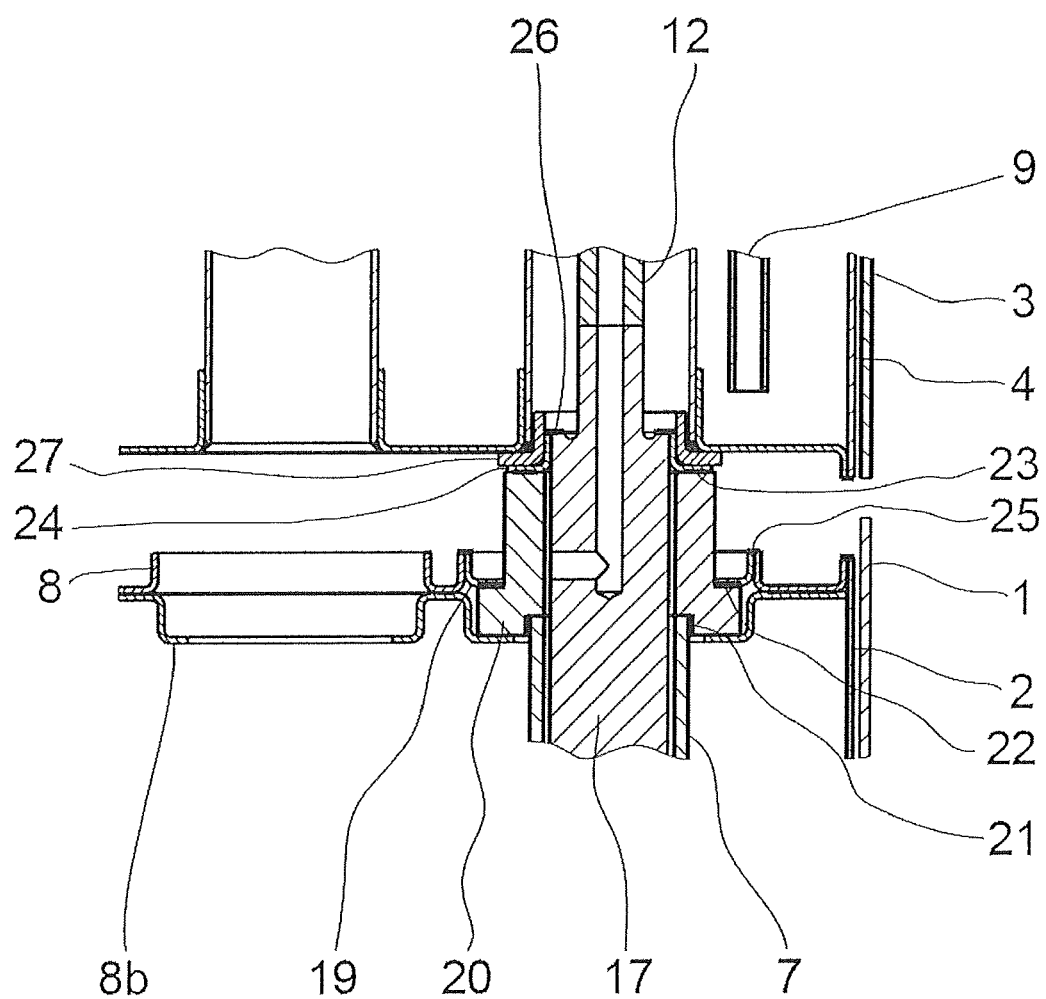

FIG. 8 shows a further variant of the installation of the ceramic which is improved with regard to mass production, installation, and mechanical stability.

Figure 9:
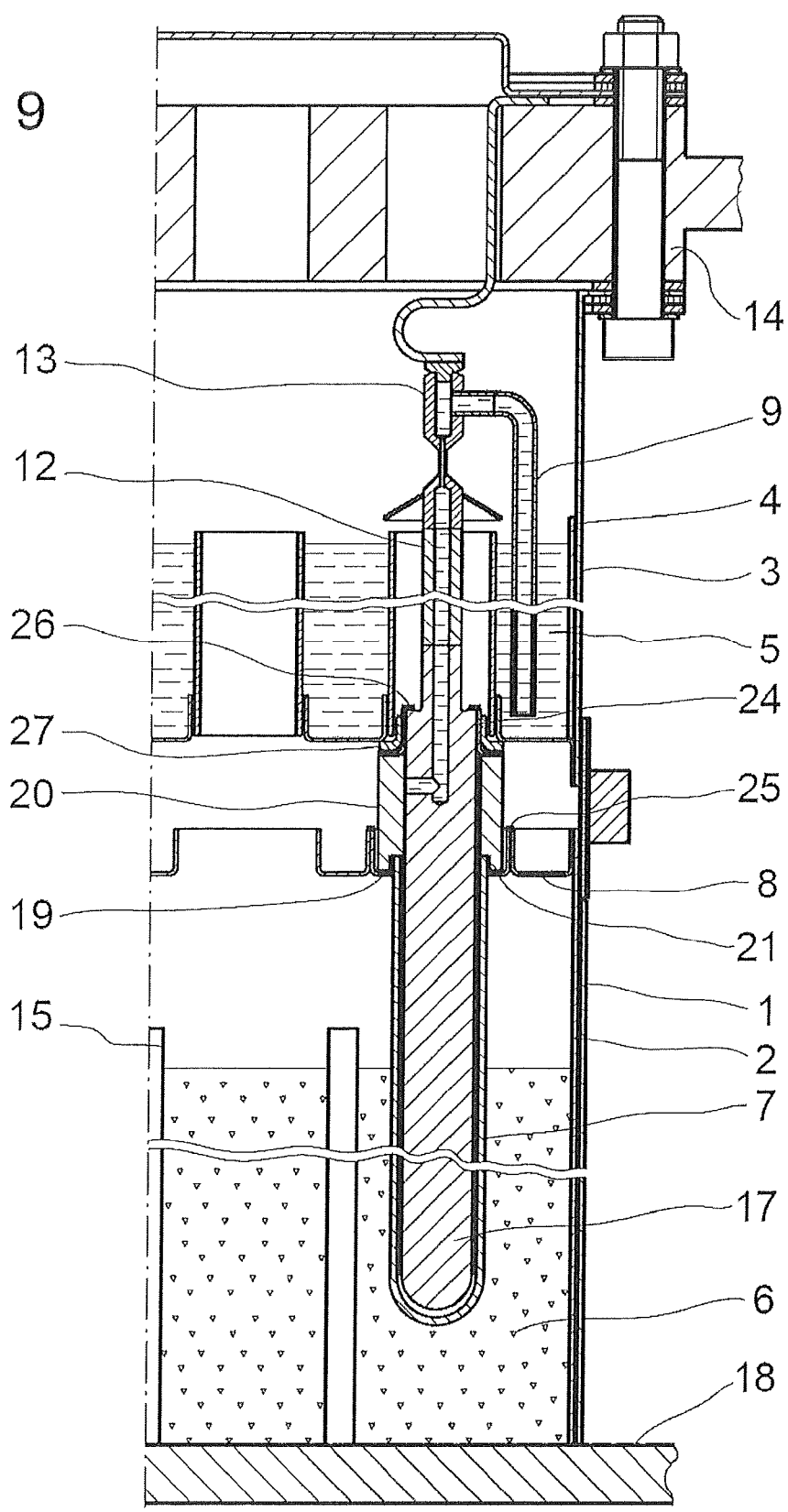

FIG. 9 shows the installation of the ceramic and the complete system as an assembly drawing.

DETAILED DESCRIPTION OF THE INVENTION

In a particular embodiment, the invention further provides a process for the transport and release of electrochemical energy in an electrochemical power station, where, at a place where energy is required, 1.) at least one stock container BS comprising high-purity liquid sulfur and a stock container BA comprising liquid high-purity alkali metal are provided,
2.) at least one electrochemical alkali metal/sulfur cell is provided, where this cell comprises at least the following components:
  2.1 an anode compartment A for accommodating liquid alkali metal,
  2.2 a cathode compartment K for accommodating liquid sulfur, where
  2.3 the compartments A and K are separated by a solid electrolyte E which at the operating temperature of the cell is permeable to cations formed by oxidation of the alkali metal,
  2.4 electrodes for closing an external current circuit for the electric power generated by the reaction of the alkali metal with the sulfur,
3.) stock containers BA are connected to the anode compartment A and stock containers BS are connected to the cathode compartment K with introduction of liquid alkali metal into the anode compartment A and liquid sulfur into the cathode compartment K,
4.) the external current circuit is closed, resulting in oxidation of the alkali metal, formation of alkali metal sulfides in the cathode compartment K and the flow of electric current,
5.) the alkali metal sulfides formed in the cathode compartment are taken off and collected in a stock container BAS,
6.) the alkali metal sulfides collected in the stock container BAS are transported to a second electrochemical cell at a place of high energy availability and are electrolyzed in the electrochemical cell to form sulfur and high-purity sodium,
7.) at least one of the components sulfur and alkali metal obtained in step 6 is transported to a place where energy is required and fed into an electrochemical power station configured as power generator, wherein an apparatus according to the invention is used.

Redox Partners

In the preferred embodiment, the redox potential of sodium and sulfur is utilized. In a further embodiment, the system made up of sodium and sodium chloride/heavy metal chloride forms the potential difference for energy storage. Preferred heavy metal chlorides are nickel(II) chloride and iron(II) chloride.

In the following, unless expressly stated to otherwise, reference is made in particular to the sodium/sulfur system. For other systems, these embodiments apply analogously and in a form with which a person skilled in the art will be familiar on the basis of the present description of the invention. Reference symbols referred to are specifically explained in detail with the aid of specific embodiments in the accompanying figures.

Positive Electrode

The sulfur electrode represents the plus side of the energy storage. This plus pole is formed by a sheet-like carbon structure, in particular a felt or nonwoven of this type, impregnated with sulfur/sodium polysulfide. The carbon electrodes are arranged concentrically around the ceramic electrolyte tubes.

Incorporation of a nonconducting open porous spacing layer prevents direct contact of the carbon electrode with the ceramic electrolyte. This prevents sodium-free nonconductive sulfur from coating the ceramic electrolyte and limiting the flow of current. The carbon electrodes are connected in a low-ohm electrically conductive manner via a system of power outlet leads (15) to the current collection rail at the bottom of the drum cell.

In a preferred embodiment, the liquid sulfur in the cathode compartment is admixed with a conductive additive. Preferred conductive additives are selenium, tetracyanoethylene, graphites and carbon black.

The alkali metal sulfides formed in the cathode compartment can comprise alkali metal sulfide and/or the corresponding polysulfides, in particular polysulfides of the formula $M_2S_x$, where x is >2, in particular sodium polysulfides $Na_2S_x$.

Negative Electrode

As material for the negative electrode, use is made, in particular, of alkali metals, in particular sodium.

Electrolyte

In a preferred embodiment, the electrolyte comprises β-aluminum oxide or β"-aluminum oxide which is preferably stabilized, preferably with MgO or $Li_2O$.

In a particularly preferred embodiment, ceramics are used as electrolyte. Possible materials for the ceramics are ceramic materials such as NASICON®, whose composition is given in EP-A 0 553 400. A particularly preferred ceramic is the ceramic also referred to as ceramic. Glasses which conduct sodium ions and also zeolites and feldspars are also suitable. However, preference is given to sodium-beta"-aluminum oxide, sodium-beta-aluminum oxide, sodium-beta/beta"-aluminum oxide. The ceramics which conduct sodium ions are preferably thin-walled tubes which are closed at the bottom end and open at the top (FIG. 2, (7)). The number is at least one and not more than 200, in a preferred embodiment 50-150. Preference is given to using ceramic tubes having a diameter of from 20 to 50 mm and a length of preferably from 0.5 m to 2 m. The wall thickness is in the range from 0.5 mm to 3 mm, preferably from 1.5 mm to 2 mm. The ceramic tubes which conduct sodium ions are preferably fastened to the drum lid (FIG. 2, (8)) of the lower drum so that they project from above into the contents of the sulfur drum. They are operated in a parallel electric connection.

Power Generation

In the generation of power in the alkali metal-sulfur reactor, alkali metal is oxidized in the anode space at the electrolyte E, with the alkali metal cations formed migrating through the semipermeable wall of the electrolyte E into the cathode component and reacting there with the sulfur to form alkali metal sulfides.

Process Parameters

The operating temperature of the electrochemical cell is preferably at least 250° C. and is preferably in the range 300-350° C.

Arrangement of the Containers BA and BS

In a particularly preferred embodiment, the containers BA and BS are drums, in particular cylindrical drums, in particular with a drum volume of from 10 to 400 liters, in particular from 100 to 300 liters. In a particularly preferred embodiment, these drums are arranged flush above one another; when the sodium/sulfur redox pair is used, the sodium drum is arranged flush above the sulfur drum. The two drums are electrically insulated from one another. The drums are modified by installation of a connecting electrolyte, in particular a conductive ceramic, so that they function as electrochemical cells.

The two drums arranged flush above one another are placed in a joint overall drum (10). Thermal insulation (11) is installed between the walls of the two internal drums and the external drum so that the internal drums can be kept at the operating temperature of 300° C.±30° C. while the outer drum is at ambient temperature.

In a preferred embodiment, the energy storage apparatus of the invention is built up in a manner analogous to a drum store. These drums can optionally communicate with a tank farm.

In the sodium-sulfur system, the solid electrolyte E, in particular a ceramic which conducts sodium ions, separates the liquid reactants. A plurality of single cells can be collected together to form modules. To optimize the power, a plurality of cell units separated by the electrolytes are connected in parallel. Regardless of the construction type, the individual cells, which each have a cell voltage of about 2 V, are connected in series or in parallel with one another. The voltage level obtained in this way is the sum of the voltages of the cell modules connected in series. The amount of sodium and sulfur introduced, optionally additionally from stock containers, is matched to the generation of power. The starting materials and products can be introduced and discharged continuously or discontinuously. Alkali metal, sulfur and alkali metal polysulfide can optionally be stored in separate, heated stock containers, in particular tanks. However, mixing of sulfur and alkali metal polysulfide is also possible in principle. According to the invention, the power station capacity is not subject to any limitation. Power station blocks of >1 MW, in particular 1-1000 MW, are therefore readily impossible. The voltage of the power station unit can, after transformation into three-phase current, be fed into the power grid. Optimization of the electrochemical reactor seeks to achieve a very large surface: volume ratio of the ceramic which conducts sodium ions to the volume of the reactants, so that a compact construction is possible, even in the case of large-scale plants, and the power density per unit volume is very high.

In a preferred embodiment, the input and/or output of electric current to the electrodes and from the electrodes occurs via a plurality of points distributed uniformly over the surface of said electrodes.

In a preferred embodiment, the liquid alkali metal is high-purity sodium, preferably sodium having a maximum content of divalent cations of less than 3 ppm. In a further preferred embodiment, the liquid nonmetal is sulfur. In a preferred process, the cell is preferably operated by the liquid alkali metal being circulated by means of an inert gas introduced under superatmospheric pressure.

Electric Connections and Insulation

In a particular embodiment, the materials forming the redox potential for each voltage level are decentrally mounted and electrically insulated from one another in the electrochemical reactor.

Since the electrochemical reactors are at different electric potential levels, the wiring and transport of materials has to be configured in such a way that electric short circuits are avoided.

Specific devices for separation of potentials are required for transfer of materials between central tanks and the individual electrochemical reactors.

Current Density

The current densities based on the surface area of the ceramic on charging and discharging the storage is in the range from 100 A/m² to 3000 A/m², preferably 1000 A/m². The sulfur electrode is on the outside of the ceramic tubes. The sodium melt is present on the inside. The sodium melt in the interior of the ceramic tube communicates via a riser tube (9) with the contents of the sodium stock container (4). The sodium runs hydrostatically from the stock container into the ceramic during the discharging process. During charging, the electrochemically generated pressure pushes the sodium back into the stock container.

The electric power output of the system is determined by the usable surface area of the ceramics which conduct sodium ions.

The capacity of the storage unit is determined by the mass of the redox partner present in a substoichiometric amount. To be able to vary power output and capacity independently of one another, the apparatus of the invention is built up according to the building block principle. The building block construction makes it possible to vary the number of ceramic tubes per drum cell. In the apparatus of the invention, the number of ceramic tubes stored in the drum cell can be varied in the range from 1 to 200, preferably from 1 to 10, and thus be matched to customer requirements.

The demand for a longer charging and discharging cycle at a fixed nominal power output makes it necessary to store a larger total amount of redox chemicals, i.e. makes it necessary to use more drums. The number of ceramic tubes per drum cell is reduced by the same factor, so that the number of ceramic tubes for the sum of all drum cells remains the same. For example, in the base case in FIG. 4, a total of 15 ceramic tubes are distributed over 3 drums. The requirement for a 1.66-fold power output cycle is met by distributing 15 ceramic tubes over 5 drums (variant).

The maximum power output of a drum is limited by the maximum number of ceramic tubes which can be accommodated in a drum cell. The nominal charging period or nominal discharging period of a drum having the maximum number of tubes is not less than 8 hours, preferably 10 hours, not more than 20 hours.

The mass-produced drum cells are, in a preferred embodiment, placed in a transport container and electrically connected in series there. The construction of any desired number of transport containers enables an electrochemical storage power station of any power output to be built up. Connection to the power grid is by means of rectifiers and DC-AC converters which are prior art.

For example, 43 drum cells were placed in a 40' shipping container (see FIG. 5). In this example, a container has a discharge power of 500 kW at a storage capacity of 7.6 MWh which can be discharged. During charging, 9.5 MWh of electric work therefore have to be expended. The nominal charging current and nominal discharge current are each 6400 A. For charging, a DC voltage of 98 volts per container has to be provided via a grid rectifier. On discharging, the DC-AC converter is provided with 80 volts per container.

Safety Precautions

In a particularly preferred embodiment, the electrolyte E is present as a ceramic tube via which the sodium is also introduced. In the case of unintended discharge, the resulting short circuit current is used to trigger a fuse, as a result of which both the power connection and the sodium flow are interrupted.

FIGURES

Figure 1:
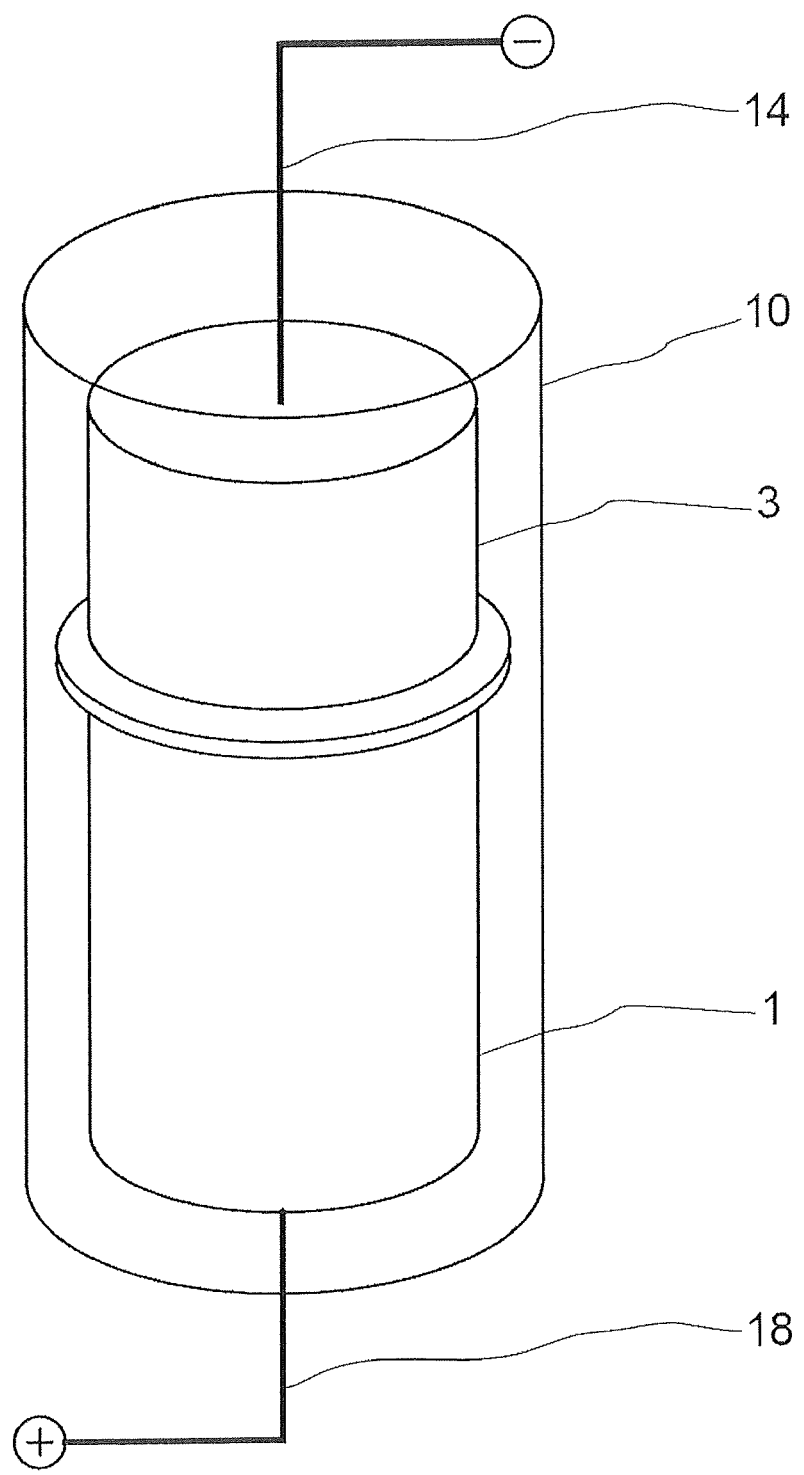
FIG. 1 schematically shows an upper steel drum (3) for accommodating sodium and a drum (1) arranged flush underneath for accommodating sulfur, with both drums being placed in a common overall drum (10).

Particularly preferred embodiments are illustrated below with the aid of figures. Here, the reference symbols used consistently have the following meanings:

3 Steel drum (upper)
4 Sodium reservoir
5 Sodium (liquid)
6 Content of the lower drum (e.g. sulfur/sodium polysulfide)
7 Ion-conducting ceramic
8 Drum lid
8b Drum lid sheet (lower)
9 Riser tube for sodium
10 Overall drum
11 Thermal insulation
12 Power inlet lead (minus side)
13 Fuse
14 Collected power inlet lead (minus side)
15 Power inlet lead (plus side)
16 Heat exchanger tube
17 Displacement body, power inlet lead
18 Collected current inlet lead (plus side)
19 Seal adapter ring (bottom)
20 Insulator ring (alpha-$Al_2O_3$)
21 Glass seal
22 Ceramic-metal join (bottom)
23 Ceramic-metal join (top)
24 Seal adapter ring (top)
25 Welding seam (bottom)
26 Welding seam (top)
27 Insulating ring
A Coolant entry
B Coolant exit FIG. 1 schematically shows an upper steel drum (3) for accommodating sodium and a drum (1) arranged flush underneath for accommodating sulfur, with both drums being placed in a common overall drum (10).

Figure 2:
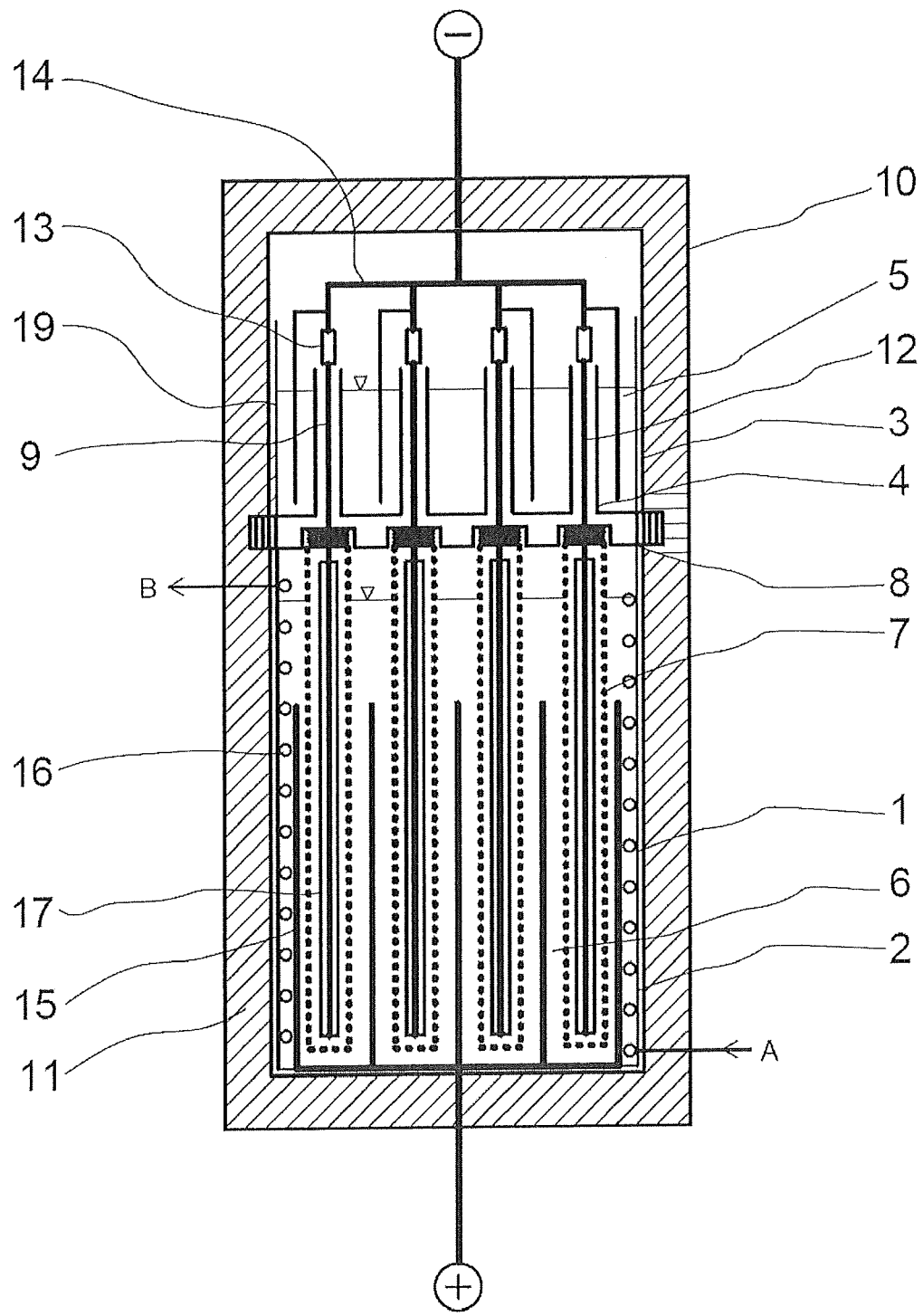
FIG. 2 shows the main element of the lower drum (1).

FIG. 2 shows the main element of the lower drum (1). It is a steel drum having an interior lining (2) made of an aluminum-magnesium sheet, preferably the alloy Al—Mg-5083. The drum content (6) is, for example, sulfur/sodium polysulfide or sodium chloride/heavy metal chloride with the electrolyte salt melt $NaAlCl_4$. The drum diameter is not less than 150 mm, not more than 1500 mm, preferably 600 mm. The drum height is not less than 300 mm, not more than 2500 mm, preferably 900 mm.

The main element of the upper drum is a steel drum (3) which is open at the bottom and has a steel sheet insert (4) which is closed at the bottom and open at the top, viz. a sodium reservoir. The sodium reservoir is provided with holes at the bottom and tube inserts in such a way that the sodium content (5) can communicate freely around the tube inserts without sodium being able to flow through the openings at the bottom (FIG. 3). The space above the sodium surface and in the free core of the tube inserts remains filled with inert gas (nitrogen). The power inlet leads (12) of the minus side are conducted from the top downward through these tube inserts to the inside of the ceramic tube. The inert gas filling insulates these power inlet leads electrically from the metallic sodium reservoir.

The power inlet lead (12) also serves, in a dual faction, as pipe for the transport of sodium between the inside of the ceramic (7) and the sodium reservoir (4). The power inlet lead of each individual ceramic tube is connected via a hollow fuse (13) to the collected current inlet lead of the minus side (14). During operation, both chambers of the drum are blanketed with inert gas (nitrogen or argon). The pressure on the sodium side is kept about 100 mm of water above that on the sulfur side. This prevents sulfur vapor from flowing into the sodium space in the case of defective ceramics.

FIG. 4 shows possible ways of distributing the electrolytes in the form of ceramic tubes over the drum cell.

FIG. 5 shows the possible arrangement of the apparatus of the invention in the form of a container.

FIG. 6 shows a particular embodiment of the electrolyte E present in the form of a ceramic: at the upper, open end of the ceramic (7), a ceramic insulator ring (20) is soldered on by means of glass in such a way that a hermetic seal is obtained. This electrically insulating insulator ring, preferably made of alpha-$Al_2O_3$, is on its underside hermetically sealed to a seal adapter ring (19), preferably made of an aluminum alloy, by means of a ceramic-metal join (22). The ceramic-metal join (22) is preferably produced by diffusion welding, particularly preferably ultrasonic welding. The seal adapter ring (19) is welded at its free end into the drum lid of the lower drum.

A second seal adapter ring (24), preferably made of an aluminum alloy, is hermetically sealed onto the upper side of the ceramic insulator ring (20) by means of a ceramic-metal join (23). This seal adapter ring (24) is welded to the displacement body, which also serves as power inlet lead (17), so that the interior or the ceramic forms a closed space. This interior space is connected to the sodium reservoir (4) above via a hole (9) in the power inlet lead (12), the special fuse (13) and the immersed tube. The sodium reservoir (4) is seated on a number of insulating rings (27) which are centered on and supported by the upper seal adapter ring (24).

A variant of the installation of the ceramic which is improved with a view to mass production is shown in FIG. 7. Here, the ceramic insulator ring (20) is modified so that the two ceramic-metal joins (22), (23) can be produced from above.

A further variant of the installation of the ceramic which is improved with regard to mass production, installation and mechanical stability is shown in FIG. 8. Here, the ceramic insulator ring (20) is modified in such a way that the two ceramic-metal joins (22), (23) can be produced from above. In addition, the drum lid is formed by two metal sheets (8), (8b), as a result of which the mechanical load on the lower ceramic-metal join (22) and the weld (25) of the lower seal adapter ring (20) are reduced. Assembly is made easier by the fact that the lower drum lid sheet (8b) installed ceramic even before welding.

FIG. 9 shows the installation of the ceramic and the complete system as assembly drawing.

Utilization of Evolved Heat

The loss heat evolved during charging or discharging of the energy storage would lead to heating of the cell. The apparatus of the invention therefore comprises heat exchanger tubes (16) via which the loss heat is removed by means of a heat transfer medium, for example heat transfer oil. The operating temperature of 300° C. allows some latitude for further utilization as energy, whether for heating, for cooling or for operating engines.

The embodiment described here, the functional integration of power inlet lead (12) and sodium transport (9) counters the unintended discharge of the energy storage in the event of failure of a single ceramic. In this case, a short circuit current occurs in the power inlet lead concerned and leads to melting of the fuse (13), as a result of which the current flow and also the sodium flow are interrupted. The storage system can therefore continue to be operated even after failure of individual functional units.

In a particularly preferred embodiment, a displacement body is comprised in at least one container BA or BS to reduce the volume of the respective reactants. Such an embodiment can serve as additional safety device.

EXAMPLES

Example 1

A) Apparatus

The apparatus shown in FIG. 2 was used. The lower steel drum (1) provided with an interior lining (2) had a nominal capacity of 200 liters and dimensions of D=580 mm and H=860 mm. The sodium reservoir (4) arranged above the lower steel drum had the dimensions D=580 mm and H=400 mm. 121 ceramic tubes which were made of beta"-$Al_2O_3$ and were closed at the bottom dipped into the lower steel drum (1), (2). The ceramic tubes had the dimensions Da=24 mm, Di=20 mm, L=820 mm.

The sodium, in total 83 liters, was in the tubes and the sodium reservoir. The sulfur having a net volume of 145 liters was in the lower drum body and flowed around the tubes. Each ceramic tube had a minus-poled power inlet lead (12) located in the interior. These power inlet leads were protected against a short circuit by means of fuses and at the top were attached to a common collection rail (14). The plus-poled power inlet leads (15) were arranged between the ceramic tubes and contacted the graphite nonwoven which was fixed around the ceramic tubes. Each ceramic tube with the two redox partners inside and outside, the graphite nonwoven and the power inlet leads formed an electrochemical single cell.

All single cells of a drum cell were electrically connected in parallel. They were therefore the same potential. The currents of all single cells added up to the total current of the drum cell. A 4-quadrant thyristor rectifier/DC-AC converter (15 000 A, 3 volt) which made controlled discharging and charging of the drum cell possible was used. Electric connection was effected by means of aluminum rails.

The surface area of the ceramic tube on the inside is 0.0515 $m^2$. With 121 tubes, the total drum has 6.23 $m^2$ of electrode area.

B) Preparation

Before charging with liquid sodium and liquid sulfur, the two inner drums of the apparatus were heated to 290° C. The temperature was maintained within ±10 K by regulating the heat transfer medium circuit in the heat exchanger tubes (16) to the appropriate temperature.

C) Charging/Discharging

In automated operation, the cell was subjected to 1000 charging/discharging cycles, with discharging for 10 hours and charging for 10 hours. Discharging was in each case carried out at 11.6 kW and charging was carried out at 14.3 kW. The current was ±6230 A.

Example 2

A) Apparatus 43 of the drum cells described in example 1 were placed in a 40' shipping container. The drum cells were connected in electrical series by means of aluminum rails. The open-circuit voltage was in this way increased to 89.4 volt. A 4-quadrant thyristor rectifier/DC-AC converter (10 000 A, 120 volt) which made controlled discharging and charging of the drum cell possible was used. Electric connection was effected by means of aluminum rails.

B) Preparation

Before charging with liquid sodium and liquid sulfur, all 43 drum cells were heated to 290° C. The temperature was maintained within ±10 K by regulating the heat transfer medium circuit in the heat exchanger tubes (16) to the appropriate temperature.

C) Charging/Discharging

In automated operation, the cell assembly was subjected to 1000 charging/discharging cycles. Discharging was in each case carried out over 10 hours and charging was then carried out over 10 hours. The discharging power was 0.5 MW. Charging was carried out at 0.613 MW. The current was ±6230 A.

The invention claimed is:

1. An apparatus for the storage of electric energy by means of materials A and S which form a redox pair and are present separately from one another, wherein
   a) the apparatus comprises the materials A and S,
   b) the materials A and S are contained separately from one another in containers BA and BS which are arranged one above the other,
   c) the containers BA and BS are joined by a solid electrolyte E which is permeable to cations, and
   d) the containers BA and BS are contained in an overall container, wherein the apparatus comprises at least two overall containers comprising containers BA and BS joined by means of a solid electrolyte E;
   wherein at least one container BA or BS comprises a displacement body to reduce the volume of the material A and/or S
   wherein the material A is an alkali metal and the material S is sulfur;
   wherein the alkali metal is present as a melt and is kept in the interior of a plurality of ceramic tubes which are made of the electrolyte E and are closed at the bottom and the spaces communicate via riser tubes with a common alkali metal reservoir above.

2. The apparatus according to claim 1, wherein the containers BA and BS are arranged flush one above the other as a drum pair.

3. The apparatus of claim 1, wherein the alkali metal is sodium.

4. The apparatus according to claim 1, wherein the electrolyte E consists essentially of a ceramic or cation-conducting glass.

5. The apparatus according to claim 4, wherein the electrolyte E consists essentially of optionally stabilized n-aluminum oxide or $\beta''$-aluminum oxide.

6. The apparatus according to claim 1, wherein the at least two overall containers are installed in a transport container, with electric poles being connected in series.

7. The apparatus according to claim 1, wherein the lower container BA or BS is a steel drum which has interior lining of an aluminum-magnesium alloy.

8. A process for the storage and release and optionally for the transport, of electric energy using an electrochemical reactor, comprising storing materials A and S in the apparatus according to claim 1, wherein the mass of the material A and/or S is reduced in at least one of the containers BA and BS by use of the displacement body.

9. The process according to claim 8, wherein the containers BA and BS are connected singly or multiply by means of the solid electrolyte E and the number thereof is variable to allow adaptation of power output and capacity.

10. The process according to claim 9, wherein the container BA is configured by use of holes in the bottom and tube inserts so that the liquid sodium can communicate freely around the tube inserts but free space for conducting through power inlet leads and sodium riser tubes remains within the tube inserts.

11. The process according to claim 8, wherein material A is a melt of an alkali metal and material S is a sulfur melt.

12. The process according to claim 11, wherein the sodium melt is moved during an electrochemical reaction by means of a hydrostatic gradient or an electrochemically generated pressure gradient.

13. The process according to claim 8, wherein the process is carried out at a temperature of at least 250° C.

* * * * *